United States Patent [19]

Bhatia

[11] Patent Number: 4,555,390
[45] Date of Patent: Nov. 26, 1985

[54] METHOD FOR REMOVING SULFUR OXIDES FROM HOT FLUE GASES

[75] Inventor: Vinay K. Bhatia, Copenhagen, Denmark

[73] Assignee: F. L. Smidth & Co. A/S, Denmark

[21] Appl. No.: 563,358

[22] Filed: Dec. 20, 1983

[30] Foreign Application Priority Data

Dec. 22, 1982 [DK] Denmark .............................. 5666/82

[51] Int. Cl.$^4$ ............................................. C01B 17/00
[52] U.S. Cl. .................................... 423/242; 423/244; 159/4.1; 159/4.2
[58] Field of Search .......... 423/242 A, 242 R, 244 A, 423/244 R; 159/4 A, 4 R

[56] References Cited

U.S. PATENT DOCUMENTS 4,208,383 6/1980 Kisters et al. ......................... 423/242
4,293,524 10/1981 Teller et al. ..................... 423/242 X

FOREIGN PATENT DOCUMENTS 49-8458 1/1974 Japan ................................... 423/242
49-8459 1/1974 Japan ................................... 423/242

*Primary Examiner*—Gregory A. Heller
*Attorney, Agent, or Firm*—Brumbaugh, Graves, Donohue & Raymond

[57] ABSTRACT

Sulfur oxides and other acid gases are removed from hot flue gases by dispersing and suspending an absorption agent and water, preferably Ca(OH)$_2$ suspended in water, in a rising stream of hot gas at the lower part of a reaction chamber, where the hot gases are subjected to a rapid reduction in velocity. Sulfur oxides and other acid gases are absorbed on and reacted with the absorption agent in the presence of evaporating water producing a dry powder which is separated from the flue gas in a particle precipitator and partially recirculated to the reaction chamber.

10 Claims, 1 Drawing Figure

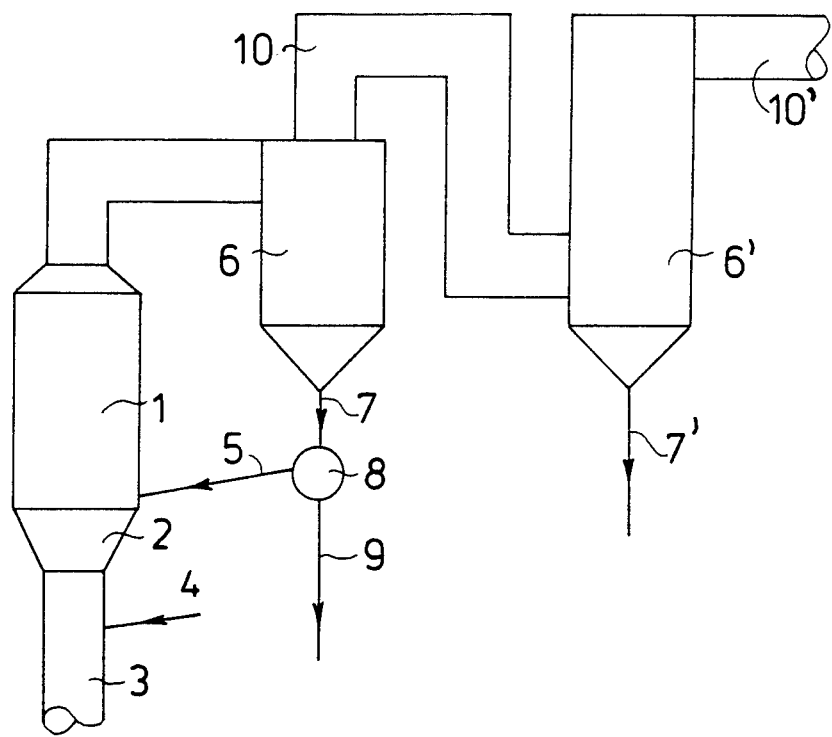

METHOD FOR REMOVING SULFUR OXIDES FROM HOT FLUE GASES

The present invention relates to a method of and apparatus for removing sulfur oxides and other acidic gases from hot flue gases, in which an absorption agent and liquid water are introduced and dispersed in a stream of hot flue gases in a reaction zone wherein sulfur oxides and other acidic gases are absorbed by and reacted with the absorption agent in the presence of evaporating liquid water, producing a dry powder comprising reaction products and unreacted absorption agent suspended in flue gas, whereafter the powder is separated from the flue gas in a separating zone and partly recycled to the reaction zone. Such a method will hereinafter be described as "of the kind described".

Various processes for removing sulfur oxides and other acidic gases from flue gas from e.g. power plants and incinerators are known.

A review of such processes is given in U.S. Pat. No. 4,197,278.

Most of these fall within one of the following main groups:

(1) Wet methods—comprising scrubbing the flue gas with suspensions or solutions of hydroxides or carbonates of alkali or alkaline-earth metals wherein the reaction products are withdrawn as a sludge.

The main advantages of the wet methods are: High sulfur oxide removal even at high sulfur oxide concentrations in the hot flue gas and high absorbent utilization. The main disadvantages are: Undesirable end products occuring as a sludge and thus presenting serious disposal problems and water saturated exit gas which must be heated prior to discharge to the atmosphere. Furthermore, clogging and corrosion in the scrubber lead to operational difficulties and unavailability of wet scrubbers.

(2) Dry methods—wherein the flue gas is brought into contact and reacted with dry absorption agents and wherein the reaction products are withdrawn as a dry powder.

The main advantages of the dry methods are: Elimination of clogging risks, dry solid end products and an exit gas which can be discharged easily to the atmosphere. However, since the gas/solid reactions are relatively slow, the sulfur oxide removal and absorbent utilization are low.

(3) Semi-dry methods—wherein the flue gas is brought into contact with aqueous suspensions or solutions of hydroxides or carbonates of alkali or alkaline-earth metals under such conditions that the water is evaporated and the reaction products are withdrawn as a dry powder.

The semi-dry methods provide highly improved sulfur oxide removal and absorbent utilization compared to the dry methods, although in general not as high as that which may be obtained by the wet methods. easily dischargeable desulfurized flue gas and a dry, flowable solid powder as end product.

Semi-dry methods are described in a number of patents and patent applications:

U.S. Pat. No. 3,932,587 describes $SO_2$ removal by treating a hot flue gas with an aqueous alkali metal carbonate and/or bicarbonate solution or slurry in a spray-dryer after fly ash has been removed from the hot flue gas.

GB-A-No. 2,021,086 describes a similar process utilizing a less expensive absorption agent: $Ca(OH)_2$ suspened in water. Improved lime utilization is achieved by avoiding fly ash removal from the hot inlet gas and by recirculation of a part of the powdery end product from the spray-dryer to the aqueous slurry directed to the spray-dryer. The viscosity of the aqueous slurry of absorption agent and recirculated powder, however, puts narrow limits to the amount of powder recirculated.

In order to overcome this disadvantage it was suggested in Danish Patent Application No. 3959/79 to recirculate the powder by blowing the dry powder directly into the spray-dryer.

It is known that a key parameter describing the operating conditions of semi-dry methods is the "approach to saturation temperature" (known as AST), defined as reaction zone exit gas temperature minus gas saturation temperature, and that sulfur oxide removal in a spary-dryer as well as in an associated fabric filter increases dramatically when AST tends to zero.

It is, however, impractical to operate a spray-dryer at low AST values because of risk of what is called "wet bottom", i.e. accumulations of moist or wet product on the walls and the bottom of the spray-dryer, which increases with decreasing AST. Such accumulations are highly undesirable because they lead to troublesome handling and discharge of solid material precipitated in the spray-dryer. Low AST values are also undesirable because they will lead to inoperable conditions in an associated bag filter.

Although great efforts have been devoted to developing semi-dry flue gas desulfurization methods employing spray-dryers, and although such methods have been realised in full scale operations on flue gases produced by combustion of low sulfur coals and containing reactive alkaline fly ash, i.e. fly ash with an alkali content contributing to the absorption of sulfur oxides and other acidic gases in the spray-dryer, there is a need for an effective, commercially feasible method and a simple compact apparatus for removing sulfur oxides and other acidic gases from flue gas, in particular from flue gas produced in power plants and incinerators, providing adequate sulfur oxide removal and efficient utilization of absorption agent.

It has now been found that it is possible to perform a method of the kind described which allows large concentrations of suspended material in the reaction zone and provides a radically increased gas/solid contact, resulting in adequate sulfur oxide removal and efficient utilization of absorption agent without the risk of the wet bottom phenomena of spray dryers, and which can be carried out in a compact apparatus of uncomplicated design.

This is achieved by a method of the kind described in which a rising stream of hot flue gases, axially introduced into the lower part of the reaction zone, is subjected to a rapid reduction in velocity so as to cause boundary layer separation of the stream in the lower part of the reaction zone; the absorption agent, the water and the powder are introduced, dispersed and suspended in the rising stream of hot flue gas in the lower part of the reaction zone; the resulting dry powder is removed from the upper part of the reaction zone suspended and entrained in the flue gases; and the powder is separated from the suspension in a separate separating zone.

This method provides an extremely intimate gas solid contact for several reasons:

(1) The boundary layer separation generates vigorous turbulent gas flow leading to vigorous dispersion of absorption agent and recirculated powder at the lower part of the reaction zone.

(2) The material, due to the boundary layer separation at the lower part of the reaction zone, is recirculated within the reaction zone, leading to particle movement upwards in the core of the reaction zone and downwards close to the walls of the confining space of the reaction zone.

(3) Interplay between gravity forces on suspended particles and friction forces between gas and suspended particles leads to further material recirculation within the reaction zone.

(4) The highly turbulent gas movement leads to increased relative velocities between gas and suspended particles leading to reduction of the gas phase diffusion resistance.

The method of the invention allows a significantly higher concentration of suspended material in the reaction zone than that achieved by methods operating with a descending or horizontal co-current gas particle flow.

Furthermore, the large build-up and rapid recirculation of material in the reaction zone provides a reduced risk of disturbances due to very low AST values.

The temperature of the hot flue gases introduced into the reaction zone is in general above 120° C. When the hot flue gas is flue gas from a power plant, the temperature is in general within the range 110° to 250°, typically 140° to 180° C.

If desired fly ash may be removed totally or partially from the hot flue gases before it is introduced into the reaction zone.

The velocity of the hot flue gases entering the reaction zone may vary depending on the load and size of the particles circulating in the reaction zone. However, it must be sufficiently high to maintain particle support in the reaction zone and prevent particle fall-out from the bottom of the zone.

The reduced velocity of the flue gases must be sufficiently high to ensure transport of the particles out of the upper part of the reaction zone, but sufficiently low to ensure proper material build-up in the reaction zone.

According to a preferred embodiment the velocity of the hot flue gases is reduced from between 10 and 60 m/sec., preferentially between 25 and 45 m/sec. to between 2 and 20 m/sec., preferentially between 3 and 6 m/sec., and the reduction in velocity corresponds to a velocity ratio $v_{initial}/v_{reduced}$ within the range 3 to 20, preferably 4 to 9.

Proper boundary layer separation and corresponding turbulence are secured with the above mentioned reduction in velocity, in particular when the reduction in velocity takes place during a period of time of between 0.05 and 0.2 times the gas retention time in the reaction zone.

Such boundary layer separation is preferentially generated by directing the hot flue gases through a divergent annular frusto-conical bottom part of the reaction zone, in particular having an apex angle greater than 12°, preferably between 12° and 120°, in particular between 40° and 90°. Apex angles greater than 120° are not desirable because of the risk of undesirable material build-up on the frusto-conical bottom of the reaction zone.

The absorption agent is preferentially selected among members of the group comprising oxides and hydroxides of calcium and magnesium and oxides, hydroxides and carbonates of alkali metals. For economic reasons $Ca(OH)_2$, preferentially prepared by slaking in a detention slaker, attrition slaker or ball mill, is the preferred absorption agent.

Absorption agent may be introduced as a dry powder or suspended or dissolved in water, and water may be introduced separately, mixed with the absorption agent, or only part of the water may be mixed with the absorption agent.

In order to achieve a high absorption agent utilization, the absorption agent is preferentially introduced suspended or dissolved in water.

The water or the suspension or solution of absorption agent in water is preferentially introduced in the reaction zone at a position where the flue gas velocity is high.

In preferred operating conditions the gas retention time in the reaction zone is 1 to 5 seconds, preferably 2 to 3 seconds, and the material retention time in the reaction zone is 1 to 8 minutes, preferentially 3 to 5 minutes, where the material retention time $t_M$ is defined as $$t_M = H_M / W_M$$

where $H_M$ is the weight of material supported in the reaction zone (kg), and $W_M$ is the weight of material input of fresh absorption agent plus solid particles present in the hot flue gas per unit time (kg/min).

As mentioned above the powder comprises reaction products and unreacted absorption agent. However, the flue gas entering the reaction zone will in general entrain fly ash particles which will be precipitated in the separating zone. Fly ash may contain reactive alkalies capable of reacting with sulfur oxides and other acidic gases under proper conditions, resulting in a reduced demand for absorption agent.

According to a preferred embodiment, the powder recirculation rate is equal to 10 to 70 times, preferentially 15 to 30 times, the input rate of absorption agent and solid particles present in the hot flue gas, where the input rate of the absorption agent is defined as the input rate of fresh absorption agent not comprising unreacted absorption agent introduced with the powder.

The material retention time in the reaction zone is controlled by the powder recirculation rate.

The average particle diameter of the recirculated powder is preferentially within the range 20 to 250 micron. This preferred size may be ensured by subjecting the dry powder separated in the separating zone to size adjustment, e.g. screening, or size reduction by comminution, e.g. in a hammer mill, before it is recirculated to the reaction zone.

Proper AST values are obtained when water is introduced into the reaction zone in an amount corresponding to 50 to 100% of the amount needed to cool the flue gas to the adiabatic saturation temperature. AST falls in general in the range of 0° to 40° C., preferentially in the range 5° to 20° C., and in particular within the range 8° to 16° C.

If desired, e.g. when operating with very low AST, the exit gas may be reheated, e.g. by by-passing a portion of the hot flue gas around the reaction zone.

After leaving the reaction zone, the flue gas is dedusted, whereby powder comprising unreacted absorption agent, reaction products and fly ash are removed in the separating zone in one or two steps in separators known per se.

In a preferred embodiment the separating zone comprises two sub-zones, a first sub-zone for precipitation of coarse particles and a second sub-zone for precipitation of fine particles.

The invention also includes apparatus for carrying out the method, which apparatus includes a reaction chamber having an upright axis, an annular bottom wall which slopes downwardly and inwardly, a central inlet for hot flue gas in the bottom wall, ducts for feeding absorption agent, powder and water into the lower part of the reaction chamber, and a suspension outlet at the top of the reaction chamber for connection to a particle precipitator having a powder outlet duct communicating with the powder feeding duct.

The reaction chamber is preferentially tubular.

The extremely intimate gas/solid contact and the high concentration of solid material in the reaction zone permit the use of a very compact apparatus of simple design and corresponding low investment costs.

Proper boundary layer separation at the lower part of the reaction zone, i.e. at the annular bottom wall, and corresponding generation of turbulence are secured when the apex angle of the annular bottom wall is greater than 12°, preferentially within the range 12° to 120°, in particular 40° to 90°, and when the ratio $A_{upper}/A_{lower}$ between the areas of the upper and lower part of the annular bottom wall is within the range 3 to 20, preferentially 4 to 9.

In a preferred embodiment the absorption agent is introduced into the reaction chamber suspended or dissolved in water, water and absorption agent being fed through the same feeding duct to the reaction chamber.

The feeding duct for the water or the water and absorption agent is preferentially provided with a gas liquid spray nozzle e.g. a venturi injection nozzle.

Particle precipitators of any known type may be used, but preferably the particle precipitator comprises a coarse separator, e.g. a cyclone separator, arranged upstream of a fine separator, e.g. an electrostatic filter or a fabric filter.

The invention will now be further described with reference to the accompanying diagrammatic drawing of apparatus according to the invention.

The apparatus comprises a tubular reaction chamber 1 provided with an annular frusto-conical bottom wall 2 and an inlet duct 3 for hot flue gases, an inlet duct 4 for absorption agent suspended or dissolved in water, and an inlet duct 5 for recirculated dry powder. The top of the reaction chamber is connected to a particle precipitator comprising a separating cyclone 6 with a material outlet 7 provided with a splitting gate 8 dividing the powder into two streams, one being recirculated to the reaction chamber 1, the other being discharged as waste product through a duct 9. The exit gas from the separating cyclone 6 is directed via a gas outlet duct 10 to an electrostatic filter 6' with a material outlet 7' and a gas outlet duct 10'. The fine powder precipitated in the electrostatic filter may be discharged as waste product or recirculated totally or partially to the reaction chamber.

If desired, the inlet duct 4 may be replaced by two ducts, one for water and another for absorption agent.

I claim:

1. A method of removing sulfur oxides from hot flue gases comprising the steps of introducing liquid water and at least one absorption agent selected from the group consisting of calcium oxides, magnesium oxides, calcium hydroxides, magnesium hydroxides, alkali metal oxides, alkali metal hydroxides and alkali metal carbonates, into a rising stream of hot flue gases in a reaction zone, contacting the absorption agent with the sulfur oxide such that the sulfur oxide is absorbed thereby and reacted therewith in the presence of evaporating liquid water so as to produce a dry powder comprising reaction products and unreacted absorption agent suspended in flue gases, separating the powder from the flue gases in a separating zone and recirculating a portion of said powder to the reaction zone, said method further comprising the steps of introducing said rising stream of hot flue gases axially into said reaction zone, said reaction zone being shaped as a vertical cylindrical chamber with a divergent conical lower portion, retaining the gas in said reaction zone during a gas retention time of about from 1 to 5 seconds, reducing the velocity of the gas in the reaction zone by passing the gas upwardly through the divergent conical lower portion thereof from a range of about 10–60 m/sec. to a range of about 2–20 m/sec. so as to cause a boundary layer separation in the gas, said conical lower portion of the reaction zone having an apex angle between 12° and 120° thereby promoting said boundary layer separation, suspending the water, absorption agent and resulting dry powder in said rising stream of hot flue gases during a material retention time of 1 to 8 minutes, thereafter passing the dry powder from the upper portion of the reaction zone to a separating zone, precipitating the powder from the flue gases in the separating zone, and recirculating a portion of the powder to the reaction zone for further treatment.

2. A method according to claim 1, wherein said reduction in velocity has a velocity ratio $v_{initial}/v_{reduced}$ within the range 3 to 20.

3. A method according to claim 2, wherein said ratio is within the range 4 to 9.

4. A method according to claim 2, wherein said gas velocity is reduced from between 25 and 45 m/sec., to between 3 and 6 m/sec.

5. A method according to claim 1, wherein said reduction in velocity takes place during a period of time between 0.05 and 0.2 times the time of retention of said gases in said reaction zone.

6. A method according to claim 1, wherein said gas retention time in said reaction zone is 2 to 3 seconds and said material retention time in said reaction zone is 3 to 5 minutes.

7. A method according to claim 1, wherein the rate of recirculating said powder is equal to between 10 and 70 times the input rate of said absorption agent and solid particles present in said hot flue gases.

8. A method according to claim 7, in which said powder recirculation rate is equal to between 15 and 30 times said input rate of said absorption agent and said solid particles present in said hot flue gases.

9. A method according to claim 1, wherein said water is introduced into said reaction zone in an amount corresponding to 50–100% of the amount needed to cool said flue gases to the adiabatic saturation temperature.

10. A method according to claim 1, wherein said separation comprises a first separation step for precipitation of coarse particles and a second separation step for precipitation of fine particles.

* * * * *